(12) United States Patent
Helwig et al.

(10) Patent No.: US 9,815,556 B2
(45) Date of Patent: Nov. 14, 2017

(54) AIRCRAFT SEAT DEVICE

(71) Applicant: RECARO Aircraft Seating GmbH & Co. KG, Schwaebisch Hall (DE)

(72) Inventors: Daniel Helwig, Schwaebisch Hall (DE); Hermann Hoffmann, Schwaebisch Hall (DE); Joerg Purfuerst, Schwaebisch Hall (DE); Andreas Itzinger, Michelfeld (DE); Sascha Knaup, Salzkotten (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 0 days.

(21) Appl. No.: 15/034,986

(22) PCT Filed: Nov. 6, 2014

(86) PCT No.: PCT/EP2014/073855
§ 371 (c)(1),
(2) Date: May 6, 2016

(87) PCT Pub. No.: WO2015/067674
PCT Pub. Date: May 14, 2015

(65) Prior Publication Data
US 2016/0288911 A1    Oct. 6, 2016

(30) Foreign Application Priority Data
Nov. 8, 2013    (DE) .................. 10 2013 112 336

(51) Int. Cl.
*A47B 83/02*    (2006.01)
*B64D 11/06*    (2006.01)

(52) U.S. Cl.
CPC .............................. *B64D 11/0638* (2014.12)

(58) Field of Classification Search
CPC ................................................... B64D 11/0638
USPC .......................... 297/144, 145, 147, 146, 163
See application file for complete search history.

(56) References Cited

U.S. PATENT DOCUMENTS 5,547,247 A    8/1996    Dixon
5,562,049 A *  10/1996   Hoffman .............. A47B 17/065
                                                          297/145 X (Continued)

FOREIGN PATENT DOCUMENTS

DE    298 20 523 U1    5/2000
DE    200 20 072 U1    5/2002

(Continued)

OTHER PUBLICATIONS

German Search Report dated Jul. 23, 2014 in the corresponding DE application No. 10 2013 112 336.8(Partial English translation attached).

(Continued)

*Primary Examiner* — Rodney B White
(74) *Attorney, Agent, or Firm* — Posz Law Group, PLC (57) ABSTRACT

The invention relates to an aircraft seat device comprising at least one table device which comprises at least one table surface and at least one adjustment device, which is provided for the purpose of adjusting the table surface between a stowed position and a use position. The adjustment device is provided for the purpose of moving the table surface in a linear displacement movement and a rotational movement at least substantially in one plane during an adjustment between the stowed position and the use position.

19 Claims, 6 Drawing Sheets

(56) References Cited

U.S. PATENT DOCUMENTS

| | | | |
|---|---|---|---|
| 8,596,206 B2 * | 12/2013 | Legeay | B60N 3/002 297/145 X |
| 8,616,137 B2 * | 12/2013 | Collins | B60N 3/002 108/137 |
| 9,173,483 B2 * | 11/2015 | Koolhaas | A47B 13/081 |
| 2007/0145216 A1 | 6/2007 | Steenson | |
| 2008/0120785 A1 | 5/2008 | Collins et al. | |
| 2009/0223417 A1 | 9/2009 | Muirhead | |
| 2012/0167807 A1 | 7/2012 | Legeay | |
| 2013/0093221 A1 * | 4/2013 | Ligonniere | B64D 11/06 297/173 |

FOREIGN PATENT DOCUMENTS

| | | |
|---|---|---|
| DE | 10 2008 012 523 A1 | 9/2009 |
| WO | 2011/100807 A1 | 8/2011 |
| WO | 2012131384 A2 | 10/2012 |

OTHER PUBLICATIONS

International Search Report dated Jan. 19, 2015 in the corresponding PCT application No. PCT/EP2014/073855.
International Preliminary Report on Patentability dated May 10, 2016 in the corresponding PCT application No. PCT/EP2014/073855.
E-mail from Examiner dated May 11, 2017 in corresponding EP patent application No. 14793851 (and English translation).

* cited by examiner

AIRCRAFT SEAT DEVICE

CROSS REFERENCE TO RELATED APPLICATIONS

This application is a U.S. national stage application of PCT/EP2014/073855 filed on Nov. 6, 2014, which is based on German Patent Application No. 10 2013 112 336.8 filed on Nov. 8, 2013, the contents of which are incorporated herein by reference.

PRIOR ART

The invention relates to an aircraft seat device according to the preamble of patent claim 1.

An aircraft seat device having at least one table device which comprises at least one table top, and having at least one adjustment device which is provided for adjusting the table top between a stowage position and a use position has already been proposed.

The object of the invention in particular lies in proving a device of the generic type, having improved properties in terms of space utilization and simple usage. According to the invention, the object is achieved by the features of patent claim 1, while advantageous design embodiments and refinements of the invention may be derived from the dependent claims.

ADVANTAGES OF THE INVENTION

The invention proceeds from an aircraft seat device having at least one table device which comprises at least one table top, and having at least one adjustment device which is provided for adjusting the table top between a stowage position and a use position.

It is proposed that the adjustment device is provided for moving the table top, during adjustment between the stowage position and the use position, in a linear displacement movement and a rotation movement in at least substantially one plane. A "table device" here is to be understood to be a device which has at least one table top which configures a table bearing surface on which, at least in an operating state, a user, in particular an airline passenger, may deposit items. Here, the table top of the table device is preferably adjustable to various positions. In principle, it is also conceivable that the table device has a table top which is formed from two parts which are arranged so as to be mutually pivotable. In principle, it is also conceivable that the table device has a primary table top and a secondary table top which is linkable to the primary table top and which may be coupled to the primary table top, for example pivotably by way of a hinge or fixedly by way of a plug-fitting connection, so as to enlarge a table bearing surface of the table device. An "adjustment device" here is understood to be in particular a device which is provided for movably mounting the table top such that the latter is adjustable between various positions. A "stowage position" here is to be understood to be in particular a position of the table top in which the table top is not provided to be used for depositing items. The table top here in the stowage position is preferably retracted in a housing such that the latter is remote from a movement space of a person who is seated in an assigned aircraft seat. Here, the table top in the stowage position is preferably disposed completely in a housing, one side of the table top preferably closing the housing. A "use position" here is to be understood to be in particular a position of the table top in which the table top is provided to be used for depositing items. To this end, the table top in the use position is positioned in a region in front of an assigned aircraft seat such that a person who is seated in the aircraft seat may readily reach the table top in an ergonomically advantageous manner. It is conceivable here that the table top has a plurality of use positions in which the table top is more or less deployed from the stowage position thereof such that the table top is disposable in various positions and at various spacings from the assigned aircraft seat. Here, the table top is preferably lockable in each of the various use positions. "Adjusting" here is to be understood to mean that the table top by way of a force acting thereon is moved between various positions such as, in particular, the stowage position or a use position. The force acting thereon is preferably transmitted directly to the table top by a person, for example by pulling the table top. However, in principle it is also conceivable that the force acting on the table top is transmitted indirectly to the table top by a person, for example by way of a lever device, that the force acting on the table top is transmitted to the table top by a pre-tensioned spring, or that the force acting on the table top is generated by a motor unit, such as an electric motor, for example, and is transmitted to the table unit by way of a transmission. "Linear displacement movement" here is to be understood to be in particular a movement of the table along a displacement axis. A "rotation movement" here is to be understood to be in particular a movement of the table about a rotation axis. "To move in one plane" here is to be understood to be in particular that the table top during the linear displacement movement and the rotation movement is located in a plane and does not move out of this plane. Here, the table top, that is to say a surface of the table, always has the same inclination to a stand plane on which the aircraft seat device stands. Here, a displacement axis in which the table is moved in the case of the linear displacement movement, and a rotation axis about which the table top is rotatable in the case of the rotation movement are mutually orthogonal. "Provided" is to be understood to mean in particular being specially conceived and/or specified. An object being provided for a specific function is to be understood to mean in particular that the object fulfills and/or carries out this specific function in at least one application and/or operating state. Here, "in at least substantially one plane" is to be understood to be in particular a deviation of less than 15 degrees, preferably of less than 10 degrees, and in a particularly advantageous design embodiment of less than 5 degrees. On account thereof that the table top of the table device in the case of the linear displacement movement thereof and the rotation movement is always moved in one plane, a particularly advantageous adjustment movement of the table top may be achieved. By way of a design embodiment according to the invention an aircraft seat device having a particularly advantageous table device which in particular is employable in a highly variable manner for various variants of aircraft seats and thereby, in particular, is capable of integration into the aircraft seat device in a particularly space-saving manner may be provided. In particular, by way of the design embodiment of the invention, a single table top which has a particularly advantageously large table bearing surface, which in particular may be achieved without additional folding table elements may be provided in a simple manner.

It is further proposed that the linear displacement movement and the rotation movement are at least in part mutually independent. Here, that the "displacement movement and the rotation movement are at least in part mutually independent" is to be understood to mean in particular that a linear displacement movement is capable of being carried out in at least a part-region of an adjustment movement without a rotation movement of the table top being axiomatically generated, or vice-versa. On account thereof, the table top may be adjusted between the stowage position and the use position in a particularly advantageous manner.

Moreover, it is proposed that the linear displacement movement and the rotation movement are configured so as to be at least partially successive. Here, that the "displacement movement and the rotation movement are configured so as to be at least partially successive" is to be understood to mean that at least at one point in time of an adjustment of the table top, the table top is moved only in the linear displacement movement, and at least at one point in time of an adjustment of the table top, the table top is moved only in the rotation movement. It is conceivable here that at least at one point in time of an adjustment of the table top, the table top is moved in an adjustment movement which is superimposed by the linear displacement movement and the rotation movement. On account thereof, an adjustment movement in which the table top is adjusted may be configured in a particularly advantageous manner.

It is furthermore proposed that the adjustment device for carrying out the rotation movement comprises at least two rotary joints which configure dissimilar rotation axes. A "rotary joint" here is to be understood to be in particular a joint which has at least two linking elements which are interconnected so as to be mutually rotatable about a rotation axis. A "rotation axis" here is to be understood to be in particular a straight line about which rotation of a body, such as in particular rotation of the table top, is or may be performed. Here, that the "rotary joints configure dissimilar rotation axes" is to be understood to mean in particular that the two rotation axes are arranged so as to be mutually spaced apart. Here, the rotation axes of the at least two rotary joints are preferably aligned so as to be mutually parallel. On account thereof, the adjustment device may be configured in a particularly simple manner.

Moreover, it is proposed that the first rotary joint and the second rotary joint are arranged below a table bearing surface and are connected to the table top. That the "rotary joints are arranged below a table bearing surface" here is to be understood to mean in particular that the rotary joints, when viewed from the table bearing surface, are disposed on the opposite lower side which in a fitted state faces a stand plane on which the aircraft seat device stands. Here, the rotary joints are preferably disposed on the lower side of the table top; however, in principle it is also conceivable that at least one of the rotary joints is incorporated laterally in a recess in the table top. A "table bearing surface" here is to be understood to be a surface which is provided for items to be deposited thereon, wherein the table bearing surface in a state in which the latter is fitted in an aircraft faces away from a stand plane on which the aircraft seat device stands. On account thereof, the rotary joints may be linked to the table top in a particularly advantageous manner and are particularly non-intrusive in a region of the table bearing surface. Moreover, particularly good stability and a particularly advantageous introduction of force into the seat element may be achieved by the two rotary joints and the disposal thereof.

It is further proposed that the two rotary joints which are connected to the table top are arranged on a rear end of the table top. A "rear end of the table top" here is to be understood to be in particular an end of the table top which in the use position faces away from a passenger or from the aircraft seat to which the table top is assigned, respectively. On account thereof, a particularly advantageous design embodiment of the adjustment device may be achieved.

It is furthermore proposed that the adjustment device for carrying out the linear displacement movement has at least two linear guides. Here, a "linear guide" is to be understood to be in particular a guide which mounts two elements so as to be in a mutual displacement movement along a displacement axis. The linear guide here has a first guide element such as, preferably, a rail element which is fixedly connected to a first element, and a second guide element which is preferably likewise configured as a rail element which engages in the first guide element and may slide therein. In principle, it is also conceivable that one of the two guide elements has one or a plurality of rolling bearings by way of which the one guide element is displaceable to the other guide element. That the "adjustment device has at least two linear guides" is to mean in particular that the adjustment device in a particularly advantageous design embodiment has two linear guides, but also that it is quite conceivable that the adjustment device for adjusting the table top comprises a plurality of linear guides which are selectively displaceable in one common displacement axis or may have dissimilar displacement axes. Friction between the two mutually displaceable guide elements is preferably set to a desired value by way of a coating such as, in particular, by way of a flocked slide coating, on account of which a defined force which is required for mutually displacing the guide elements may be advantageously set. On account thereof, the adjustment device for carrying out the displacement movement may be configured in a particularly advantageous and stable manner.

It is further proposed that the at least two linear guides are configured as sliding guides. That a "linear guide is configured as a sliding guide" is to be understood to mean in particular that two guide elements of the linear guide are intercoupled by way of a sliding bearing. On account thereof, the guide elements may be configured in a particularly simple and advantageous manner.

It is further proposed that the at least two linear guides are arranged so as to be mutually pivotable. That the "linear guides are arranged so as to be mutually pivotable" is to be understood to mean in particular that the displacement axis of at least one of the linear guides at least in an operating state is configured so as to be pivotable to the displacement axis of the other linear guide. Here, the displacement axes of the two linear guides in a pivoted state deviate from being mutually parallel but still lie in the same plane. On account thereof, the table top during adjustment may be adjusted in a particularly advantageous manner and be positioned to the assigned aircraft seat in an advantageous manner.

It is moreover proposed that the aircraft seat device has a console which comprises at least one receptacle for the table device, the first linear guide being fixed in said receptacle. Here, a "console" is to be understood to be in particular an element of an aircraft seat device or of a seat region which is provided for receiving or fastening accessories assigned to the aircraft seat or to the seat region, such as, for example, for attaching a screen or for attaching storage and/or support elements such as table or leg supports. The console here preferably defines a space which is not visible to a passenger. A "receptacle" here is to be understood to be in particular an element which is provided for receiving another element such as, in particular, the table device. The receptacle here is preferably formed by a recess which is closed or is at least not visible from the outside in at least two directions, advantageously in at least three directions, and in one particularly advantageous design embodiment, in five directions. The receptacle here has at least one opening across which at least the table top may be moved in a region outside the receptacle. In the stowage position, the entire table device with the table top and the adjustment device is disposed in the receptacle, a lateral face of the table top in the stowage position preferably closing the receptacle. In principle, it is also conceivable that the table top in the stowage position in part protrudes from the receptacle. A part of the table top that in the stowage position protrudes from the receptacle here could have a receptacle for receiving beverage containers, for example, or may be configured as a handle element by way of which the table top may be readily gripped and adjusted by a user. Here, the console in a region of the receptacle preferably has protective coating which protects the console from damage such as scratches, in particular. Here, the protective coating is provided in particular in order for a surface of the console to be protected from damage which may be caused by inappropriate adjustment of the table top. However, in principle it is also conceivable that the receptacle has a pivotable flap which in the stowage position of the table top closes the receptacle to the outside. It is conceivable here that the pivotable flap does not cover the entire table device but only the adjustment device such that the latter is not intrusive to the eye. On account thereof, the table device and in particular the table top in the stowage position may be disposed in a particularly advantageous manner without being potentially intrusive to a passenger and so as to be invisible in the aircraft seat device.

It is moreover proposed that the first rotary joint couples the linear guide, which is fixed in the receptacle, to the table top. Here, "coupling" in this context is to be understood to mean in particular that both the linear guide which is linked in the receptacle, as well as the table top are linked to the first rotary joint, that is to say that the table top and the linear guide which is linked in the receptacle are interconnected by way of the first rotary joint. On account thereof, the table top for carrying out the adjustment movement may be connected to the linear guide and, on account thereof, to the receptacle in a particularly advantageous manner.

It is further proposed that the one rotary joint that couples the first linear guide, which is fixed in the receptacle, to the table top is delimited to a maximum pivot angle. Here, a "maximum pivot angle" is to be understood to be in particular an angle by which the rotary joint may at maximum rotate about the rotation axis thereof. The maximum pivot angle here is in a range from 70 degrees to 180 degrees, the maximum pivot angle preferably being 110 degrees and in a particularly advantageous design embodiment being 90 degrees. On account thereof, a maximum deployed use position of the table top may be set in an advantageous manner.

It is moreover proposed that the adjustment device has a third rotary joint which mounts the second linear guide so as to be rotatable in relation to the console. Here, a "third rotary joint" is to be understood to be in particular a further rotary joint which has a rotation axis that deviates from those of the other rotary joints. On account thereof, the second linear guide may be attached so as to be pivotable to the first linear guide in a particularly simple and advantageous manner.

It is furthermore proposed that the second rotary joint couples the table top to the second linear guide. On account thereof, the table top for carrying out the adjustment movement may be coupled to the second linear guide in a particularly advantageous manner.

The aircraft seat device according to the invention here is not intended to be limited to the application and embodiment described above. In particular, the aircraft seat device according to the invention for fulfilling a functional mode described herein may have a number of individual elements, components, and units which deviates from the number mentioned herein.

DRAWINGS

Further advantages are derived from the following description of the drawings. Two exemplary embodiments of the invention are illustrated in the drawings. The drawings, the description, and the claims contain numerous intercombined features. The person skilled in the art will expediently also consider the features in isolation and devise further purposeful combinations thereof.

In the figures.

DESCRIPTION OF THE EXEMPLARY EMBODIMENTS

FIGS. 1 to 8 show an aircraft seat device according to the invention. The aircraft seat device is part of an aircraft seat (not illustrated in more detail) in a seat region (not illustrated in more detail). The aircraft seat device is assigned to the aircraft seat (not illustrated in more detail). The seat region is configured as a region in which at least one aircraft seat is disposed. Here, the aircraft seat is configured as an airline passenger seat which is provided for seating an airline passenger during a flight. In principle, it is also conceivable for two or more aircraft seats to be disposed in one seat region. Here, one aircraft seat device would preferably be assigned to each aircraft seat. The aircraft seat device comprises a table device 10*a* for providing a table bearing surface 26*a* on which an airline passenger sitting in the aircraft seat may deposit items. To this end, the table device 10*a* comprises a table top 12*a*. The table top 12*a* on the upper side thereof configures the table bearing surface 26a. The table bearing surface 26a of the table top 12a in a fitted state is disposed on a side which faces away from a stand plane on which the aircraft seat having the aircraft seat device stands. The table top 12a is configured as a flat board which has an approximately rectangular cross section. Here, edges at a rear end 28a of the table top 12a are rounded. The table top 12a at a front end 40a on a first side 44a has a chamfer 42a. The table top 12a on a second side 46a at the front end 40a likewise has a radius. Here, the table top 12a in the extent thereof from the first side 44a to the second side 46a has the main extent thereof. The table in an extent from the front end 40a to the rear end 28a has a smaller extent than in the main extent thereof. In principle, it is also conceivable for the table top to have another shape which appears purposeful to the person skilled in the art, such as a square or a round shape, for example. In principle, it is likewise conceivable that the table top 12a is formed from a plurality of parts which are pivotably intercoupled by means of hinges, for example. It is possible here that the table top 12a is formed from a main part and from one or a plurality of smaller additional parts which may be unfolded on demand so as to enlarge the table bearing surface of the table device 10a. The table top 12a here is formed from aluminum. In principle, it is also conceivable for the table top 12a to be formed from another material such as, for example, from another light alloy, from a plastics material, and/or from a fiber-composite material.

Figure 1:
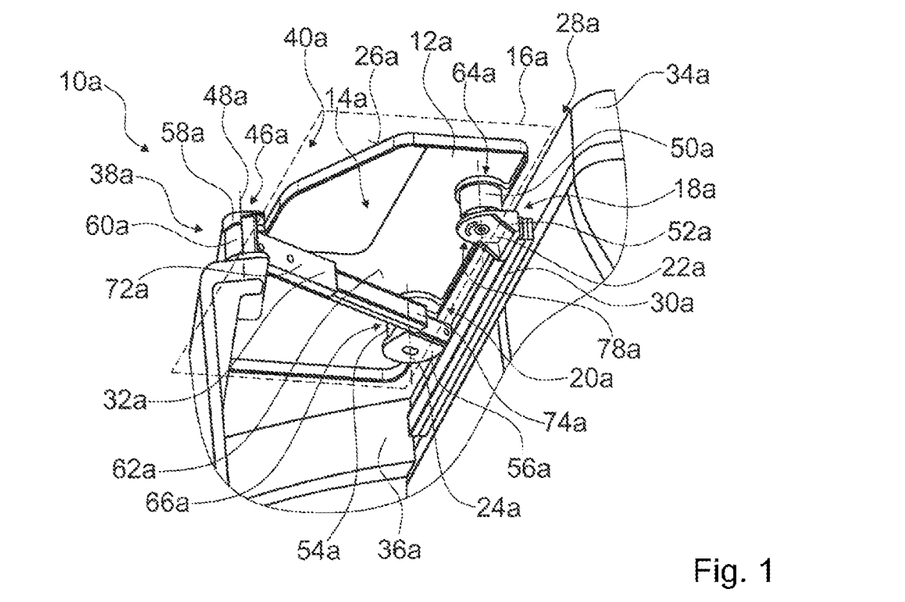
FIG. 1 shows a schematic illustration of an aircraft seat device according to the invention, in a first exemplary embodiment having a table top of a table device in a stowage position.
Figure 3:
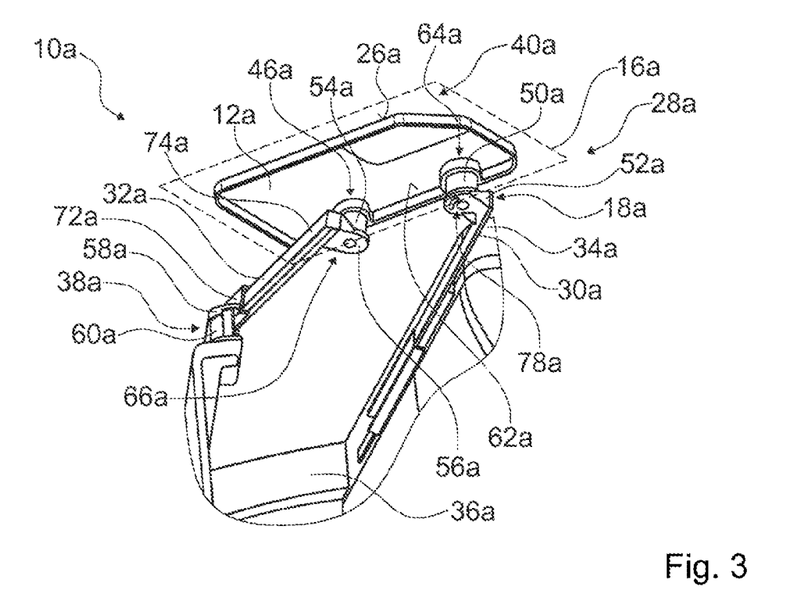
FIG. 3 shows a further illustration during an adjustment movement of the table top out of the stowage position, shortly before reaching a primary use position.
Figure 4:
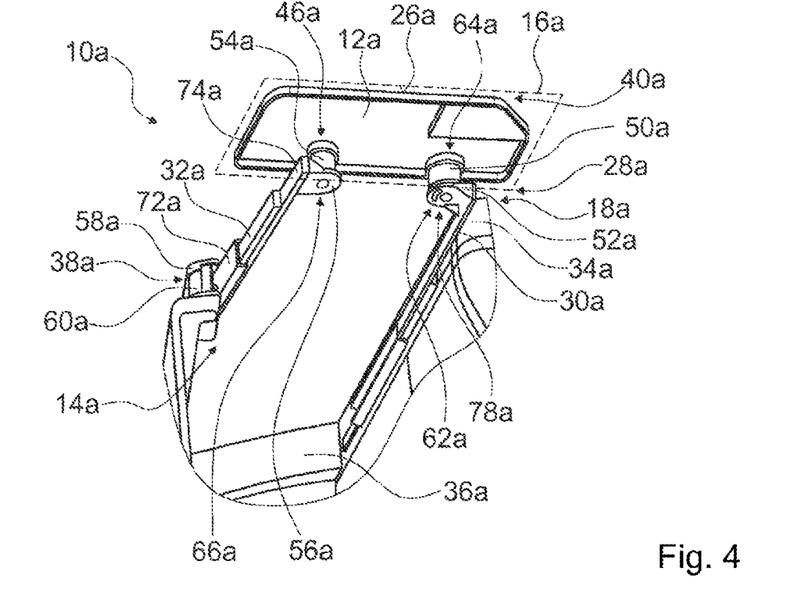
FIG. 4 shows a schematic illustration of the table device having the table top in the primary use position.
Figure 5:
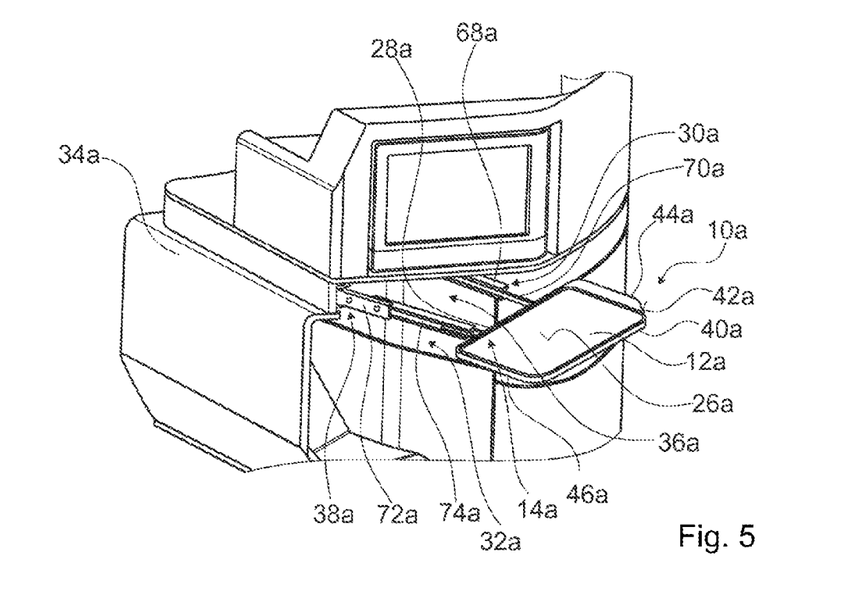
FIG. 5 shows a schematic illustration of an aircraft seat device according to the invention, having a console and the table device in the primary use position.
Figure 6:
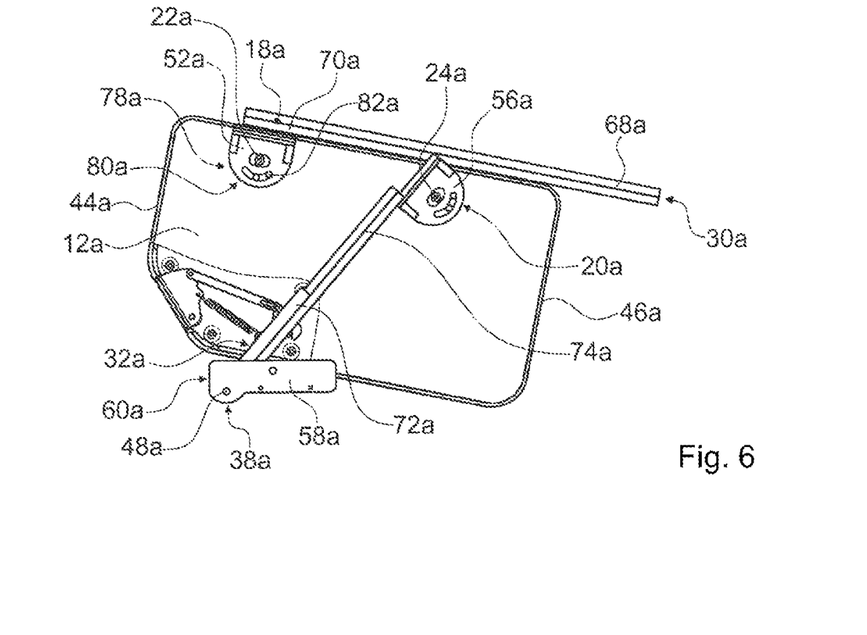
FIG. 6 shows a plan view of the table device according to the invention.

The table device 10a comprises an adjustment device 14a. The adjustment device 14a is provided for adjusting the table top 12a between a stowage position and at least one use position. Here, FIG. 1 shows the table top 12a in the stowage position. The stowage position here is configured as a position of the table top 12a, in which the table top 12a is not utilizable by a passenger. In the stowage position the table top 12a is stowed and is moved out of a movement space of the seat region, on account of which said table top 12a is not intrusive and in the way of a passenger. The table bearing surface 26a here in the stowage position is covered and cannot be utilized for depositing items. In the stowage position the table top 12a is secured and is secured against being undesirably moved out of the stowage position. In a use position the table bearing surface 26a of the table top 12a is released and may be utilized for depositing elements. Here, the table top 12a has a plurality of use positions. Here, FIG. 4 shows the table top 12a in a primary use position. The table top 12a in the primary use position is deployed to a maximum by means of the adjustment device 14a. The table top 12a here is moved to a maximum toward the aircraft seat to which the former is assigned. The table top 12a here in the primary use position is locked and is displaced back in the direction of the stowage position only upon an actuation force having been applied to the table top 12a. In a second use position the table top 12a is disposed in a position between the primary use position and the stowage position (cf. FIG. 3). The adjustment device 14a may emit an acoustic or haptic signal once the table top 12a reaches the primary use position. In this way, a person who has displaced the table top 12a to the primary use position may readily realize that the primary use position has been reached. In order for the signal to be generated, the adjustment device 14a has a pressure pin (not illustrated in more detail) which in the pressure pin position audibly latches into a receptacle. The pressure pin here may also be used for locking the table top 12a in the primary use position. Here, the table bearing surface 26a of the table top 12a is released in the second use position of the table top 12a, and may be utilized for bearing items.

In order for the table device 10a to be received, the aircraft seat device comprises a console 34a. The console 34a is configured as an element of the seat region to which and in which accessories of the seat region are attached. For example, a screen and/or storage and receiving elements are disposed here in and on the console 34a. The console 34a comprises a receptacle 36a in order for the table device 10a to be stowed. The table device 10a at least in the stowage position of the table top 12a is disposed completely in the receptacle 36a. The receptacle 36a is open toward the seat region. Here, an opening which opens the receptacle 36a toward the seat region is of such a size that the table top 12a and the adjustment device 14a can be deployed from the receptacle 36a so as to be brought to a use position. In the stowage position the table device 10a is disposed completely in the receptacle 36a of the console 34a. The table top 12a and the adjustment device 14a are disposed in the console 34a so as to not be intrusive to a passenger. Here, the table top 12a by way of the first side thereof closes the receptacle 36a of the console 34a. In principle, it is also conceivable that the console 34a has a pivotable flap which closes the receptacle 36a toward the outside when the table top 12a in the stowage position thereof is disposed completely in the receptacle 36a of the console 34a.

In order for the table top 12a to be adjusted between the stowage position and the use position, the adjustment device 14a is provided for moving the table top 12a in a linear displacement movement and in a rotation movement in one plane 16a. The table top 12a during the entire displacement movement between the stowage position and the primary use position remains in the plane 16a, that is to say that an angle between the table bearing surface 26a and the stand plane remains constant. In principle, it is conceivable here that the angle between the table bearing surface 26a and the stand plane is slightly varied by flexing of parts of the table device 10a due to forces acting on the table. The table top 12a here to the stand plane has an angle of 3 degrees. The plane 16a in which the table top 12a is moved in the rotation movement and in the linear displacement movement here is aligned so as to be at an angle of 3 degrees to the stand plane. Of course, other angles are also conceivable here, in principle.

In the case of the linear displacement movement the table top 12a is linearly displaced along a displacement axis. In the case of the rotation movement the table top 12a is rotated about a rotation axis 22a, 24a and, on account thereof, is modified in terms of the alignment thereof. Here, the linear displacement movement and the rotation movement are mutually independent. The table top 12a may be displaced in a purely linear manner or else be moved in an only rotational manner. The linear displacement movement and the rotation movement are not intercoupled. In order for the table top 12a to be adjusted from the stowage position to a use position, or vice-versa, the table top 12a however has to be moved both in the rotation movement as well as in the linear displacement movement. Here, the linear displacement movement and the rotation movement are configured so as to be at least partially successive. Here, the table top 12a, proceeding from the stowage position, is initially moved only in the linear displacement movement. After the purely linear displacement movement, the table top 12a is then moved in a movement in which the linear displacement movement and the rotation movement are superimposed. In order for the adjustment from the stowage position to the primary use position of the table top 12a to be completed, the table top 12a is moved only in the rotation movement. However, in principle it is also conceivable that the table top 12a during adjustment between the stowage position and a use position, or vice-versa, is always moved only in the linear displacement movement or only in the rotation movement. Here, the table top 12a may be moved by a person at least in part in an arbitrary manner in the linear displacement movement and in the rotation movement. In principle, it is also conceivable that the adjustment device 14a has a forced guide which permits only one possible adjustment path between the stowage position and the primary use position.

The adjustment device 14a for carrying out the rotation movement of the table top 12a comprises three rotary joints 18a, 20a, 38a. The three rotary joints 18a, 20a, 38a are provided for rotatably mounting the table top 12a. The three rotary joints 18a, 20a, 38a here configure rotation axes 22a, 24a, 48a which are in each case dissimilar. The rotation axes 22a, 24a, 48a of the rotary joints 18a, 20a, 38a here run in a mutually parallel manner. The rotation axes 22a, 24a, 48a of the three rotary joints 18a, 20a, 38a here are arranged so as to be mutually spaced apart. The rotary joints 18a, 20a, 38a here in each case configure one first linking element 50a, 54a, 58a, and one second linking element 52a, 56a, 60a. Here, the two linking elements 50a, 52a, 54a, 56a, 58a, 60a of a rotary joint 18a, 20a, 38a are mutually rotatable about the respective rotation axis thereof. Here, the first rotary joint 18a and the second rotary joint 20a are arranged below the table bearing surface 26a of the table top 12a. The two rotary joints 18a, 20a are attached to a lower side 62a of the table top 12a. The two rotary joints 18a, 20a here are in each case disposed on the rear end 28a of the table top 12a. For linking the rotary joints 18a, 20a, the table top 12a on the lower side 62a thereof has in each case two receptacles 64a, 66a. Here, the two rotary joints 18a, 20a with the first linking element 50a, 54a thereof are fixedly connected to the table top 12a by way of the receptacles 64a, 66a. Here, the first linking elements 50a, 54a of the rotary joints 18a, 20a by means of a materially integral and/or form-fitting connection which appears purposeful to the person skilled in the art are disposed in the respective receptacle of the table top 12a, for example by means of an adhesive connection or a screw connection. Here, the first rotary joint 18a in a state linked to the table top 12a faces the first side 44a of the table top 12a. The second rotary joint 20a in a state linked to the table top 12a faces the second side 46a of the table top 12a. Here, the first rotary joint 18a extends farther away from the lower side 62a of the table top 12a than the second rotary joint 20a. On account thereof, a linking point of the second linking element 52a of the first rotary joint 18a has a larger spacing from the lower side 62a of the table top 12a than a linking point of the second linking element 56a of the second rotary joint 20a.

In order for the linear displacement movement to be carried out, the adjustment device 14a comprises two linear guides 30a, 32a. The linear guides 30a, 32a each have two mutually displaceable guide elements 68a, 70a, 72a, 74a. Here, the guide elements 68a, 70a, 72a, 74a are configured as sliding rails. The guide elements 68a, 70a, 72a, 74a of a linear guide 30a, 32a, which are configured as sliding rails are in mutual form-fitting contact and are mutually displaceable in a displacement axis. The guide elements 68a, 70a, 72a, 74a which are configured as sliding rails here each have contact surfaces by way of which each of the former is in contact with the respective and corresponding guide element 68a, 70a, 72a, 74a which is configured as a sliding rail. The linear guides 30a, 32a here are configured as coated linear guides. On account thereof, the linear guides have particularly advantageous sliding properties and in particular run smoothly and are silent. To this end, the guide elements 68a, 70a, 72a, 74a of the linear guides 30a, 32a, on the contact faces of the former, in each case have a coating. The coating is configured as a flocked slide coating. The coating which is configured as a flocked slide coating here is composed of a matrix of fibers embedded in a plastics material. The fibers here are preferably configured as polymer fibers. The combination of the fibers embedded in the plastics material significantly reduces the friction-related resistance of the contact surfaces.

The first linear guide 30a is fixedly disposed in the receptacle 36a of the console 34a. Here, the first linear guide 30a is disposed on a first side 76a of the receptacle 36a. The first guide element 68a here is rigidly joined in the receptacle 36a to the console 34a. Here, the first guide element 68a is rigidly connected to the console 34a by means of a screw connection (not illustrated in more detail). On account thereof, the first guide element 68a of the first linear guide 30a cannot move to the console 34a. On account thereof, a displacement axis of the first linear guide 30a is fixedly secured. The second guide element 70a of the first linear guide 30a to the first guide element 68a is displaceable in the displacement axis and, on account thereof, is also displaceable to the console 34a. The first linear guide 30a here is coupled to the first rotary joint 18a. The first rotary joint 18a connects the first linear guide 30a to the table top 12a. Here, the second guide element 70a of the first linear guide 30a on an end that faces away from the first guide element 68a has a receptacle for the first rotary joint 18a. The second linking element of the first rotary joint 18a is linked to the second guide element 70a and thus to the linear guide 30a by way of the receptacle of the second guide element 70a. The table top 12a by way of the first rotary joint 18a is arranged so as to be rotatable to the first linear guide 30a. Here, the first rotary joint 18a which couples the first linear guide 30a to the table top 12a is limited to a maximum pivot angle of 90 degrees. To this end, the first rotary joint 18a has a delimiting device 78a. The delimiting device 78a has an arcuate groove 80a which is incorporated into the second linking element 52a of the first rotary joint 18a, and a pin 82a which is configured by the first linking element 50a and which engages in the groove 80a. The arcuate groove 80a configures a circular arc of 90 degrees. The pin 82a which engages in the groove 80a delimits rotation of the first rotary joint 18a in that said pin 82a abuts the ends of the arcuate groove 80a. On account thereof, a very simple rotary delimitation for the first rotary joint 18a may be achieved.

The two linear guides 30a, 32a are arranged so as to be mutually pivotable. To this end, the second linear guide 32a is configured so as to be pivotable to the console 34a. To this end, the second linear guide 32a is pivotably linked in the receptacle 36a of the console 34a. Here, the second linear guide 32a is attached on a second side 84a of the receptacle 36a that lies opposite the first side 76a of the receptacle 36a. Here, the third rotary joint 38a mounts the second linear guide 32a so as to be rotatable to the console 34a. The third rotary joint 38a by way of the first linking element 58 thereof is fixedly connected to the console 34a. The first linking element 58a of the third rotary joint 38a here is screwed on by means of a screw connection to the second side 84a of the receptacle 36a. In principle, it is also conceivable for the first linking element 58a to be coupled to the receptacle 36a by means of another type of connection such as, for example, by means of an adhesive connection or another form-fitting connection. The first linking element 58a of the third rotary joint 38a has a receptacle 86a which is formed by two arms, a bolt by way of which the second linking element 60a of the third rotary joint 38a is pivotably connected to the first linking element 58a being mounted in receptacle bores between said two arms. In principle, another design embodiment of the rotary joint 38a is also conceivable. The second linking element 60a of the third rotary joint 38a is rigidly connected to the first guide element 72a of the second linear guide 32a. Here, the second linking element 60a of the third rotary joint 38a is fixedly connected to the first guide element 72a of the second linear guide 32a by means of a screw connection. In principle, it would also be conceivable for the second linking element 60a of the third rotary joint 38a and the first guide element 72a of the second linear guide 32a to be configured so as to be mutually integral. The first guide element 72a by way of the third rotary joint 38a is pivotably disposed in the console 34a. On account thereof, a displacement axis in which the second guide element 74a is displaceable to the first guide element 72a of the second linear guide 32a is pivotable about the rotation axis 48a which configures the third rotary joint 38a.

The second rotary joint 20a couples the table top 12a to the second linear guide 32a. Here, the second rotary joint 20a is coupled to the second guide element 74a of the second linear guide 32a. The second linking element 56a of the second rotary joint 20a here is fixedly connected to the second guide element 74a of the second linear guide 32a. Since the first linking element 54a of the second rotary joint 20a is fixedly connected to the table top 12a, the second guide element 74a of the second linear guide 32a is rotatably coupled to the table top 12a. Here, the table top 12a by way of the second rotary joint 20a, the second linear guide 32a, and the third rotary joint 38a, is connected to the second side 84a of the receptacle 36a of the console 34a. The table top 12a, by way of the first rotary joint 18a and the first linear guide 30a is connected to the first side 76a of the receptacle 36a of the console 34a.

Figure 7:
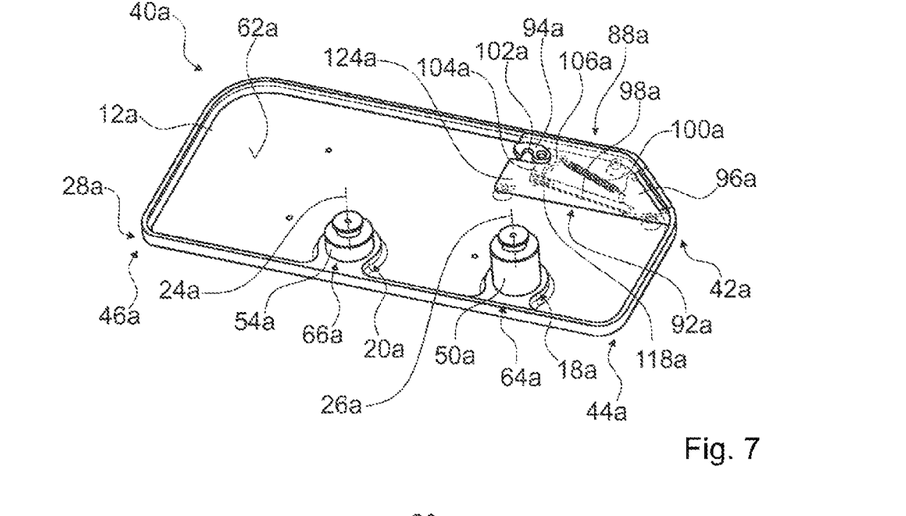
FIG. 7 shows a schematic illustration of the table device having a locking mechanism.
Figure 8:
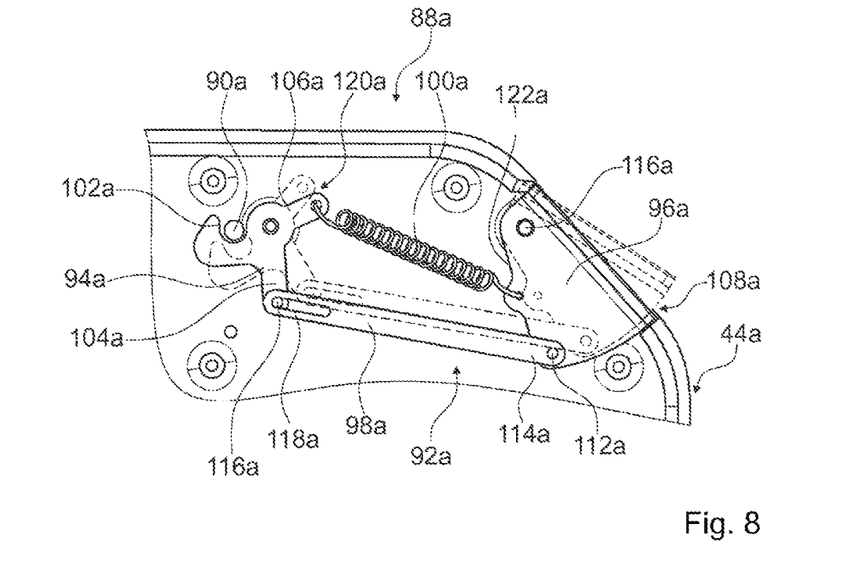
FIG. 8 shows a superimposed illustration of a locked state and of an unlocked state of the locking mechanism.

In order for the table top 12a to be securely fixed in the stowage position, the table device 10a comprises a locking mechanism 88a. The locking mechanism 88a is provided in order for the table top 12a to be secured against inadvertent adjustment when in the stowage position. In a locking position, the locking mechanism 88a connects the table top 12 directly in a form-fitting manner to the console 34a. To this end, the locking mechanism 88a has a locking pin 90a. The locking pin 90a is rigidly connected to the console 34a. It is conceivable here that the locking pin 90a is configured so as to be integral with the console 34a. The locking pin 90a here extends from below toward the lower side 62a of the table top 12a. The locking mechanism 88a comprises a locking mechanism 92a which is fixedly connected to the table top 12a. The locking mechanism 92a is disposed on the lower side 62a of the table top 12a. Here, the locking mechanism 92a lies on the first side 44a of the table top 12a. The locking mechanism 92a comprises a pivotably mounted locking hook 94a. The locking hook 94a by way of a sliding mounting is rotatably disposed on the lower side 62a of the table top 12a. The locking hook 94a comprises a form-fit element 102a which is configured as a hook and which is provided for encompassing the locking pin 90a in the locking position and in this way to be coupled to the locking pin 90a in a form-fitting manner. The locking hook 94a configures two linking arms 104a, 106a to which further elements of the locking mechanism 92a are linkable. In order for the locking mechanism 88a to be actuated, the locking mechanism 92a comprises an actuation element 96a. The actuation element 96a is provided in order to be actuated by a person. The actuation element 96a is disposed on the first end of the table top 12a in the region of the chamfer 42a. The table top 12a here in the first side 44a in the region of the chamfer 46a has an opening 108a in which the actuation element 96a is in part disposed and in this way is actuatable from the outside by a person. The actuation element 96a is disposed on the lower side 62a of the table top 12a, so as to be rotatable about a pivot axis 110a. The actuation element 96a may be pivoted about this pivot axis 110a by at least 3 degrees by an operator. The locking mechanism 92a comprises a lever arm 98a which is provided for transmitting an unlocking movement from the actuation element 96a to the locking hook 94a. The lever arm 98a at a first end is coupled to the actuation element 96a. Here, the lever arm 98a is pivotably coupled to the actuation element 96a. To this end, the actuation element 96a configures a pin 112a by way of which the lever arm 98a is connected in a form-fitting manner via a through bore 114a which is incorporated in the lever arm 98a. At a second end, the lever arm 98a is pivotably coupled to the linking arm 104a of the locking hook 94a. Here, the locking arm 104a configures a pin 116a by way of which the lever arm 98a is connected in a form-fitting manner via an elongate hole 118a. In order for a restoring force to be generated for the actuation element 96a and for the locking hook 94a, the locking mechanism 92a has a spring element 100a. The spring element 100a is configured as a coil spring. The spring element 100a is connected to the second linking arm 106a of the locking hook 94a and to the actuation element 96a. Here, the linking arm 106a of the locking hook 94a, and the actuation element 96a each have a through bore 120a, 122a in which the spring element 100a is respectively hooked into. The spring element 100a is pre-tensioned in a locking position. The spring element 100a is elongated and, on account thereof, further tensioned by an unlocking movement in which the actuation element 96a and, via the lever arm 98a, also the locking hook 94a are pivoted. The restoring force, which pulls the actuation element 96a and the locking hook 94a back to the locking position once the actuation force which has been applied by a user is absent, is created by the elongation of the spring element 100a. In FIG. 8, the locking mechanism 92a is illustrated in the locking position and, indicated by dashed lines, in the unlocking position. Here, for reasons of clarity, the spring element 100a has been omitted in the illustration of the unlocking position. As is illustrated in FIG. 7, the locking mechanism 88a comprises a cover plate 124a which in the downward direction covers the locking mechanism 92a. The cover plate 124a here is illustrated only with dashed lines.

Figure 2:
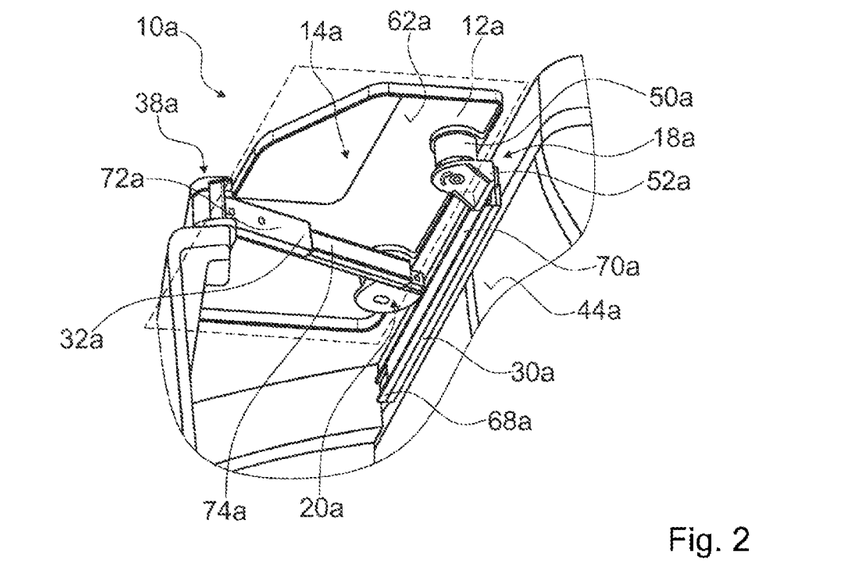
FIG. 2 shows a schematic illustration at the commencement of an adjustment movement of the table top out of the stowage position.

Adjustment of the table top 12a between the stowage position and the primary use position is to be briefly described hereunder. The table top 12a in the stowage position is completely disposed in the receptacle 36a of the console 34a and is locked by the locking mechanism. Here, the two linear guides 30a, 32a are completely retracted. As can be seen in FIG. 1, the second linear guide 32a here by means of the third rotary joint 38a is pivoted toward the rear. Here, the second linear guide 32a is pivoted by more than 90 degrees to the first linear guide 30a. The first linear guide 30a, due to the dissimilar height arrangements of the second linking elements 52a, 56a of the first rotary joint 18a and of the second rotary joint 20a, is arranged below the second linear guide 32a. On account thereof, the second linear guide 32a and the second rotary joint 20a can encroach on the first linear guide 30a, as can be seen in FIGS. 1 to 3. The second linear guide 32a and the second rotary joint 20a here are disposed in the stowage position and, at the commencement of any adjustment out of stowage position, are disposed between the lower side 62a of the table top 12a and the first linear guide 30a. On account thereof, the table device 10a may advantageously be configured in a space-saving manner. In the stowage position, the first side 44a of the table top 12a closes off the receptacle 36a toward the outside. A person seated in the assigned aircraft seat may here see and reach the first side 44a of the table top 12a and the actuation element 96a integrated thereinto. In order for the table top 12a to be unlocked, a person may now actuate and pivot the actuation element about the pivot axis 110a as per FIG. 8. The locking hook 94a is rotated by way of the lever arm 98a, the form-fit element 102a of the locking hook 94a releasing the form-fit with the locking pin 90a. By releasing the form-fit between the form-fit element 102a of the locking hook 94a and the locking pin 90a, the table top 12a may be pulled out of the receptacle 36a. Once the table top 12a has been pulled somewhat out of the receptacle 36a, and the form-fit element 102a of the locking hook 94a has been removed from the locking pin 90a, an actuation force may again be removed from the actuation element 96a, on account of which the actuation element 96a and the locking hook 96a by way of the restoring force of the spring element 100a are rotated back to locking position thereof. The table top 12a may now be gripped and further moved by a person. Here, as can be seen in FIGS. 1 and 2, the second linear guide 32a is initially inclined to the rear and disposed between the table top 12a and the first linear guide 30a. During adjustment from the locking position, the table top 12a is initially only displaced in a linear manner along the displacement axis of the first linear guide 30a. Here, the first rotary joint 18a initially remains in the initial position thereof from the stowage position and does not rotate. The second guide element 70a of the first linear guide 30a is displaced to the first guide element 68a. The second rotary joint 20a and the third rotary joint 38a rotate in order to follow the movement of the table top 12a; here the guide elements 72a, 74a of the second linear guide 32a are also mutually displaced. Upon having been completely deployed from the receptacle 36a of the console 34a, the table top 12a may be rotated about the first rotary joint 18a. Here, the table top 12a on having been deployed from the receptacle 36a, may be utilized in a plurality of use positions for depositing items. Once the first linear guide 30a is completely deployed, that is to say once the second guide element 70a has been adjusted to the maximum to the first guide element 68a, the table top is rotated about the first rotary joint 18, in order for the primary use position to be reached (cf. FIG. 3). The first rotary joint 18a here is rotated so far until the delimiting device 78a impacts, thus preventing further rotation of the first rotary joint 18a and thus of the table top 12a. Once the first rotary joint 18a is rotated up to the stop thereof, the table top 12a is in the primary use position thereof. Adjustment of the table top 12a from the primary use position to the stowage position is performed accordingly in the reverse manner.

Figure 9:
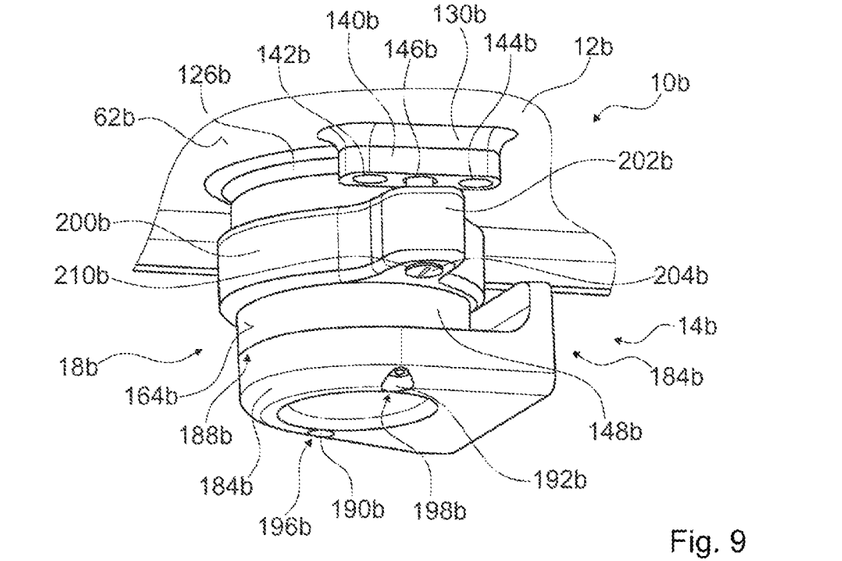
FIG. 9 shows a schematic illustration of part of an aircraft seat device according to the invention, in a second exemplary embodiment having an adjustment device and a rotary joint.
Figure 10:
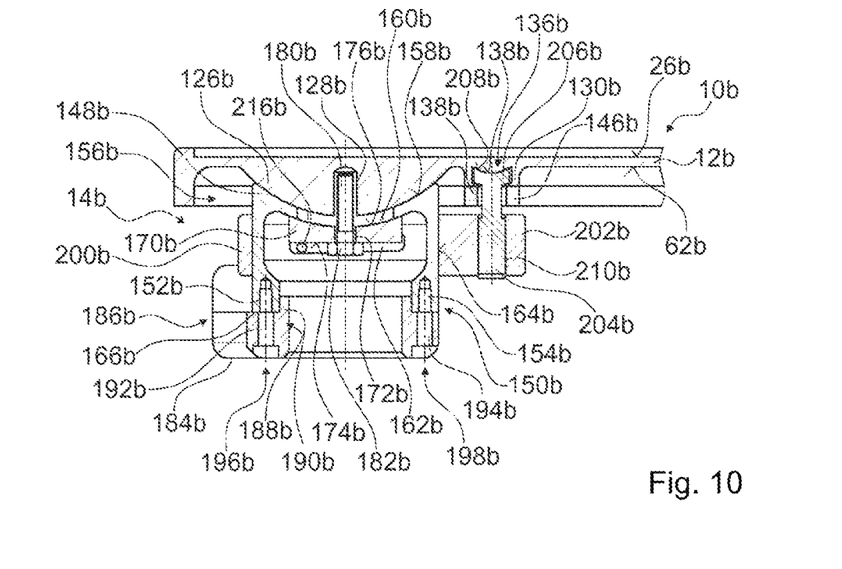
FIG. 10 shows a sectional view through the rotary joint of the adjustment device of the aircraft seat device according to the invention.
Figure 11:
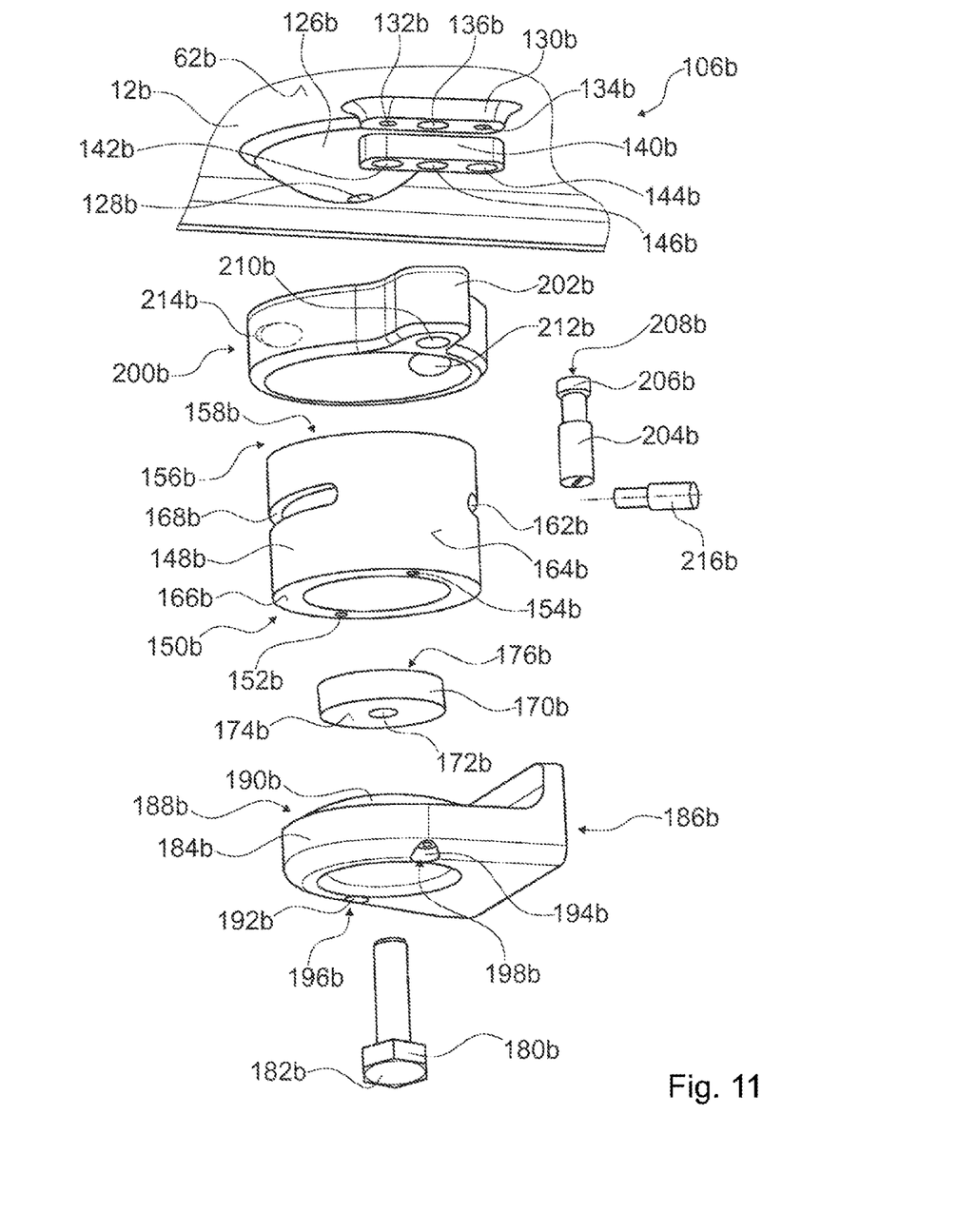
FIG. 11 shows an exploded illustration of the rotary joint of the adjustment device of the aircraft seat device according to the invention.

A further exemplary embodiment of the invention is shown in FIGS. 9 to 11. The following descriptions and the drawings are substantially limited to the points of difference between the exemplary embodiments wherein in terms of components with the same reference, in particular with the same reference sign, reference may be made in principle also to the drawings and/or to the descriptions of the other exemplary embodiment, in particular to that of FIGS. 1 to 8. In order for the exemplary embodiments to be differentiated the index letter a has been added to the reference signs of the exemplary embodiment in FIGS. 1 to 8. The index letter a is replaced by the index letter b in the exemplary embodiments of FIGS. 9 to 11.

FIGS. 9 to 11 show a second exemplary embodiment of an aircraft seat device according to the invention. The aircraft seat device is part of an aircraft seat (not illustrated in more detail) in a seat region (not illustrated in more detail). The aircraft seat device comprises a table device 10b for providing a table bearing surface 26b on which an airline passenger sitting in the aircraft seat may deposit items. To this end, the table device 10b comprises a table top 12b. The table top 12b on the upper side thereof configures the table bearing surface 26b. The table top 12b is configured so as to be substantially identical to that of the first exemplary embodiment. The table device 10b comprises an adjustment device 14b. The adjustment device 14b is provided for adjusting the table top 12b between a stowage position and at least one use position. In order for the table top 12b to be adjusted between the stowage position and the use position, the adjustment device 14b is provided for moving the table top 12b in a linear displacement movement and in a rotation movement in substantially one plane 16b. Here, the adjustment device is provided for inclining the table top 12b by 3 degrees during adjustment between the stowage position and the use position. Here, the table top 12b in the stowage position is aligned so as to be parallel with a stand plane on which the aircraft seat stands. In the primary use position, the table top 12b is inclined by 3 degrees to the stand plane. Here, the table top 12b in a flight direction is inclined by 3 degrees. Here, a front end of the table top 12b points upward, away from the stand plane. Here, a rear end of the table top 12b in the primary use position is aligned downward in the direction of the stand plane. The adjustment device 14b is only partially illustrated. In order for a linear displacement movement to be carried out, the adjustment device 14b comprises two linear guides (not illustrated in more detail here). The linear guides are configured in an identical manner to the corresponding linear guides from the first exemplary embodiment of FIGS. 1 to 8. Here, the first linear guide is fixedly connected to a receptacle of a console. The second linear guide by way of a rotary joint of the adjustment device is arranged so as to be pivotable to the receptacle and additionally to the first linear guide. In a manner which differs from the first exemplary embodiment, the linear guides are aligned so as to be parallel with the stand plane. On account thereof, displacement axes of the linear guides run parallel with the stand plane.

In order for the rotation movement of the table top 12b to be carried out, the adjustment device 14b comprises two further rotary joints 18b. Each of the rotary joints 18b is provided for connecting the table top 12b to one linear guide each. Here, the two rotary joints 18b are provided for rotating the table top 12b about the rotation axis thereof and simultaneously tilting said table top 12b to the stand plane. Here, during pivoting of the two rotary joints 18b, the table top 12b is tilted by 3 degrees. In principle, it is also conceivable that the table top is tilted in relation to the stand plane by another angle, for example 2 degrees. Here, only one of the two rotary joints 18b is described hereunder. Likewise, only one of the two rotary joints 18b is illustrated in FIGS. 9 to 11. The following description of a rotary joint 18b may also be perused for explaining the other rotary joint which is not illustrated in more detail. The two rotary joints 18b are positioned in an identical manner to the two first rotary joints from the first exemplary embodiment. The two rotary joints 18b differ from the corresponding rotary joints from the first exemplary embodiment of FIGS. 1 to 8 only in one design embodiment.

The rotary joint 18b is disposed on a lower side 62b of the table top 12b. The rotary joint 18b is constructed in multiple parts and is in part configured so as to be integral with the table top 12b. The rotary joint 18b comprises an elevation 126b which is disposed on the lower side 62b of the table top 12b. The elevation 126b is configured so as to be spherical. The elevation 126b is configured so as to be integral with the table top 12b. In principle, it is also conceivable that the elevation 126b is configured as a separate component which is fixedly connected to the table top 12b. The spherical elevation 126b in a center has a threaded bore 128b. The threaded bore 128b has an internal thread. The rotary joint 18b further comprises a linking flange 130b which is disposed next to the spherical elevation 126b. The linking flange 130b comprises two threaded bores 132b, 134b which are arranged so as to be mutually spaced apart. A receptacle bore 136b which has a spherical base 138b is disposed between the two threaded bores 132b, 134b. The base 138b of the receptacle bore 136b here is configured so as to be convex. The rotary joint 18b further comprises a closure plate 140b which is provided to be screwed to the linking flange 130b. To this end, the closure plate 140b comprises two blind holes 142b, 144b which in a fitted state are arranged so as to be congruent with the threaded bores 132b, 134b of the linking flange 130b. A through bore 146b is disposed in the closure plate 140b between the blind holes 142b, 144b, so as to be congruent with the receptacle bore 136b in the fitted state. A diameter of the through bore 146b here is smaller than a diameter of the receptacle bore 136b of the linking flange 130b. The closure plate 140b in the fitted state is fixedly connected to the linking flange 130b by means of two screws.

The rotary joint 18b further comprises a guide element 148b. The guide element 148b is configured so as to be tubular. At a first axial end 150b, the tubular guide element 148b is opened. On a first axial wall 166b at the first axial end 150b, the tubular guide element 148b has two threaded bores 152b, 154b for linking screw elements. The two threaded bores 152b, 154b here are disposed on opposite sides and have a mutual angular spacing of 180 degrees. The first axial end 150b in the fitted state faces away from the lower side 62b of the table top 12b. At a second axial end 156b, the tubular guide element 148b is substantially closed. Here, an axial wall 158b of the tubular guide element 148b is configured so as to be concave. Here, the axial wall 158b has a concavity which corresponds to a convexity of the spherically configured elevation 126b. In a fitted state the concave axial wall 158b bears on the spherical elevation 126b which is disposed on the table top 12b. The guide element 148b in the axial wall 158b has a through bore 160b. The through bore 160b is configured as an elongate hole. The through bore 160b which is configured as an elongate bore is provided for a screw element to be guided therethrough in a fitted state. In order for the table top 12b to be pivoted in a targeted manner, the guide element 148b has a first guide curve 162b for an adjustment by 3 degrees. The guide curve 162b is incorporated into a radial wall 164b of the guide element 148b. The guide curve 162b here is configured as a through bore. Here, the guide curve 162b is aligned so as to be oblique to the first axial wall 166b of the guide element 148b. The guide curve 162b here has a main direction of extent which runs so as to be approximately parallel with a main direction of extent of the through bore 160b which is configured as an elongate hole in the concave axial wall 158b. The guide element 148b has a second guide curve 168b. The second guide curve 168b is provided for an adjustment by 2 degrees. The second guide curve 168b is disposed on an opposite side of the radial wall 164b of the guide element 148b. Depending on which of the two guide curves 162b, 168b is active, the table top 12b in the case of adjustment to the primary use position may be adjusted by 3 degrees or by 2 degrees. In principle, it is also conceivable that the guide curves 162b, 168b are configured such that other angles are reached in the case of adjustment of the table top 12b. In principle, it is also conceivable for the guide element 148b to have only one guide curve 162b, 168b, or two identically configured guide curves 162b, 168b.

In order for the guide element 148b to be fixed to the table top 12b, the rotary joint 18b has a fastening plate 170b. The fastening plate 170b is configured as a disk. The fastening plate 170b which is configured as a disk has an external diameter which is smaller than an internal diameter of the tubular guide element 148b. The fastening plate 170b has a through bore 172b which is arranged so as to be centric. A first axial surface 174b of the fastening plate 170b is configured so as to be planar and is provided for configuring a bearing surface for a screw. A second axial surface 176b which in a fitted state faces an internal side of the concave axial wall 158b of the guide element 148b and thereby bears on the latter is configured so as to be convex. In order for the guide element 148b to be fastened to the table top 12b, the rotary joint 18b has a fastening screw 180b. To this end, the fastening screw 180b is guided through the through bore 172b in the fastening plate 170b and through the through bore 160b, which is configured as an elongate hole, in the concave axial wall 158b of the guide element 148b, and is screwed into the threaded bore 128 which is arranged so as to be centric in the spherical elevation 126b. The fastening screw 180b, by way of the screw head 182b thereof, bears on the first axial face 174b of the fastening plate 170b which configures the bearing surface for the screw. On account thereof, the guide element 148b is fixed to the table top 12b but may be rotated thereto and be tilted in relation to the table top 12b in a manner parallel with the through bore 160b which is configured as an elongate hole.

In order for the rotary joint 18b to be linked to the corresponding linear guide, the rotary joint 18b has a linking element 184b. The linking element 184b comprises a flange 186b. By means of the flange 186b the linking element 184b is fixedly and rigidly coupleable to the corresponding linear guide. The linking element 184b is provided for being connected to the guide element 148b. In order to be linked to the guide element 148b the linking element 184b has a receptacle 188b. The receptacle 188b has a circular elevation 190b. The circular elevation 190b is provided for engagement in the first axial end 150b of the guide element 148b. In order for the linking element 184b to be linked to the guide element 148b by means of a screw connection, the receptacle 188b of the linking element 184b has two blind holes 192b, 194b which, in a manner corresponding to the threaded bores 152b, 154b, are disposed on the first axial end 150b of the guide element 148b. In a fitted state, fastening screws 196b, 198b are guided through the blind holes 192b, 194b of the receptacle 188b and are screwed into the threaded bores 152b, 154b at the first axial end 150b of the guide element 148b. On account thereof, the guide element 148b is coupled to the linking element 184b in a rotationally fixed manner.

In order for tilting of the table top 12b to be generated during pivoting, the rotary joint 18b has an adjustment ring 200*b*. The adjustment ring 200*b* is configured so as to be annular and has an internal diameter which is larger than an external diameter of the guide element 148*b*. In a fitted state, the guide element 148*b* is disposed within the adjustment ring 200*b*. The adjustment ring 200*b* comprises a linking bracket 202*b*. The linking bracket 202*b* has a threaded bore 210*b*. In order for the adjustment ring 200*b* to be linked to the table top 12*b*, the rotary joint 18*b* has an adjustment screw 204*b*. The adjustment screw 204*b* has a thread by way of which the former is screwed into the threaded bore 210*b* of the linking bracket 202*b*. The adjustment screw 204*b* at a first end has a form-fit element 206*b*. The form-fit element 206*b* configures a concave end face 208*b* by way of which the adjustment screw 204*b* in a fitted state bears on the base 138*b* of the receptacle bore 136*b* of the linking flange 130*b* on the lower side 62*b* of the table top 12*b*. In a fitted state, the adjustment screw 204*b* by way of the form-fit element 206*b* thereof is fixed in the receptacle bore 136*b* of the linking flange 130*b*. To this end, the adjustment screw 204*b* is guided through the receptacle bore 136*b* of the closure plate 140*b* which is screwed to the linking flange 130*b*. On account thereof, the adjustment screw 204*b* is fixed in a form-fitting manner by the closure plate 140*b* in the receptacle bore 136*b* of the linking flange 130*b*. Depending on how far the adjustment screw 204*b* is screwed into the threaded bore 210*b* of the linking bracket 202*b* of the adjustment ring 200*b*, a spacing of the adjustment ring 200*b* from the lower side 62*b* of the table top 12*a* may be varied. The farther the adjustment screw 204*b* is screwed into the threaded bore 210*b* of the linking bracket 202*b* of the adjustment ring 200*b*, the larger a spacing of the adjustment ring 200*b* from the lower side 62*b* of the table top 12*b*. The adjustment ring 200*b*, by way of the linking bracket 202*b*, the adjustment screw 204*b*, and the linking flange 130*b* is secured to the lower side 62*b* of the table top 12*b* so as to be rotationally fixed to the table top 12*b*. The adjustment ring 200*b* is provided to be coupled by way of one of the guide curves 162*b*, 168*b* of the guide element 148*b*. If the table top 12*b* is to be adjusted by 3 degrees, the adjustment ring 200*b* is coupled to the guide curve 162*b* for an adjustment by 3 degrees. If the table top 12*b* is to be adjusted by 2 degrees, the adjustment ring 200*b* is coupled to the guide curve 168*b* for an adjustment by 2 degrees. The adjustment ring 200*b* has a first threaded bore 212*b* and a second threaded bore 214*b* for coupling to the guide element 148*b*. The first threaded bore 212*b* is provided for coupling the adjustment ring 200*b* to the guide curve 162 for an adjustment by 3 degrees. The second threaded bore 214*b* is provided for coupling the adjustment ring 200*b* to the guide curve 168*b* for an adjustment by 2 degrees. The threaded bores 212*b*, 214*b*, are incorporated into the adjustment ring 200*b* in a corresponding manner. In order for the adjustment ring 200*b* to be coupled to the guide element 148*b*, the rotary joint 18*b* has a threaded pin element 216*b*. If the table top 12*b* is to be adjusted by 3 degrees, the threaded pin element 216*b* is screwed into the corresponding threaded bore 212*b*, with one end engaging in a form-fitting manner in the corresponding guide curve 162*b* for an adjustment by 3 degrees. If the table top 12*b* is to be adjusted by 2 degrees, the threaded pin element 216*b* is screwed into the corresponding threaded bore 214*b*, by one end engaging in a form-fitting manner in the corresponding guide curve 168*b* for an adjustment by 2 degrees. Upon rotation of the rotary joint 18*b*, the threaded pin element 216*b* is displaced in the corresponding guide curve 162*b*, 168*b* in which the former is engaged. Due to the oblique alignment of the guide curves 162*b*, 168*b*, the guide element 148*b* is tilted in relation to the table top 12*b*. Since the guide element 148*b* is linked to the console by way of the linking element 184*b* and the corresponding linear guide, said linking element 184*b* and the linear guide being fixed in a plane which is parallel with the stand plane, the table top 12*b* is tilted in relation to the stand plane by tilting the guide element 148*b* to the table top 12*b*.

The elements of the rotary joint 18*b* here are formed from aluminum. In principle, it is also conceivable that the elements of the rotary joint 18*b* are formed from another material which appears purposeful to the person skilled in the art, such as from a plastics material or another metal, for example. It is conceivable here that the threads on the rotary joint 18*b* are in each case configured by threaded inserts. Contact surfaces of the rotary joint 18*b*, such as the spherical elevation 126*b* and the concave axial wall 158*b* of the guide element 148*b*, for example, may be configured so as to be hardened. It is conceivable here for these elements to be coated or anodized.

LIST OF REFERENCE SIGNS

10 Table device
12 Table top
14 Adjustment device
16 Plane
18 Rotary joint
20 Rotary joint
22 Rotation axis
24 Rotation axis
26 Table bearing surface
28 Rear end
30 First linear guide
32 Second linear guide
34 Console
36 Receptacle
38 Rotary joint
40 Front end
42 Chamfer
44 First side
46 Second side
48 Rotation axis
50 First linking element
52 Second linking element
54 First linking element
56 Second linking element
58 First linking element
60 Second linking element
62 Lower side
64 Receptacle
66 Receptacle
68 First guide element
70 Second guide element
72 First guide element
74 Second guide element
76 First side
78 Delimiting device
80 Groove
82 Pin
84 Second side
86 Receptacle
88 Locking mechanism
90 Locking pin
92 Locking mechanism
94 Locking hook
96 Actuation element
98 Lever arm
100 Spring element 102 Form-fit element
104 Linking arm
106 Linking arm
108 Opening
110 Pivot axis
112 Pin
114 Through bore
116 Pin
118 Elongate hole
120 Through bore
122 Through bore
124 Cover plate
126 Elevation
128 Threaded bore
130 Linking flange
132 Threaded bore
134 Threaded bore
136 Receptacle bore
138 Base
140 Closure plate
142 Blind hole
144 Blind hole
146 Through bore
148 Guide element
150 First axial end
152 Threaded bore
154 Threaded bore
156 Second axial end
158 Concave wall
160 Through bore
162 Guide curve
164 Radial wall
166 Axial wall
168 Guide curve
170 Fastening plate
172 Through bore
174 Face
176 Second axial surface
180 Fastening screw
182 Screw head
184 Linking element
186 Flange
188 Receptacle
190 Elevation
192 Blind hole
194 Blind hole
196 Fastening screw
198 Fastening screw
200 Adjustment ring
202 Linking bracket
204 Adjustment screw
206 Form-fit element
208 End face
210 Threaded bore
212 Threaded bore (adjustment ring)
214 Threaded bore (adjustment ring)
216 Threaded pin element

The invention claimed is:

1. An aircraft seat device comprising:
at least one table device which comprises at least one table top; and
at least one adjustment device which is provided for adjusting the table top between a stowage position and a use position, wherein
the adjustment device is provided for moving the table top, during adjustment between the stowage position and the use position, in a linear displacement movement and a rotational movement in at least substantially one plane, and
the adjustment device for carrying out the rotational movement comprises at least a first rotary joint and a second rotary joint which configure dissimilar rotational axes, the first rotary joint and the second rotary joint are both attached to a single surface of the at least one table top.

2. The aircraft seat device as claimed in claim 1, wherein the linear displacement movement and the rotational movement are mutually independent.

3. The aircraft seat device as claimed in claim 2, wherein the linear displacement movement and the rotational movement are configured so as to be at least partially successive.

4. The aircraft seat device as claimed in claim 2, wherein the adjustment device for carrying out the linear displacement movement has at least two linear guides.

5. The aircraft seat device as claimed in claim 1, wherein the linear displacement movement and the rotational movement are configured so as to be at least partially successive.

6. The aircraft seat device as claimed in claim 1, wherein the first rotary joint and the second rotary joint are arranged below a table bearing surface and are connected to the table top.

7. The aircraft seat device as claimed in claim 6, wherein the first rotary joint and the second rotary joint which are connected to the table top are arranged on a rear end of the table top.

8. The aircraft seat device as claimed in claim 1, wherein the first rotary joint and the second rotary joint which are connected to the table top are arranged on a rear end of the table top.

9. The aircraft seat device as claimed in claim 1, wherein the adjustment device for carrying out the linear displacement movement has at least a first linear guide and a second linear guide.

10. The aircraft seat device as claimed in claim 9, wherein the at least the first linear guide and the second linear guide are configured as sliding guides.

11. The aircraft seat device as claimed in claim 10, wherein the at least the first linear guide and the second linear guide are arranged so as to be mutually pivotable.

12. The aircraft seat device as claimed in claim 9, wherein the at least the first linear guide and the second linear guide are arranged so as to be mutually pivotable.

13. The aircraft seat device as claimed in at least claim 9, comprising a console which comprises at least one receptacle for the table device, the first linear guide being fixedly coupled in said receptacle.

14. The aircraft seat device as claimed in at least claim 13, wherein the adjustment device has a third rotary joint which mounts the second linear guide so as to be rotatable to the console.

15. The aircraft seat device as claimed in at least claim 9, wherein the first rotary joint couples the first linear guide, which is fixed in the receptacle, to the table top.

16. The aircraft seat device as claimed in at least claim 9, wherein the first rotary joint that couples the first linear guide, which is fixed in the receptacle, to the table top, is delimited to a maximum pivot angle.

17. The aircraft seat device as claimed in at least claim 9, wherein the second rotary joint couples the table top to the second linear guide.

18. An aircraft seat region having an aircraft seat device as claimed in claim 1.

19. An aircraft seat device comprising:
- at least one table device which comprises at least one table top;
- at least one adjustment device which is provided for adjusting the table top between a stowage position and a use position; and
- a console which comprises at least one receptacle for the table device, wherein
- the adjustment device is provided for moving the table top, during adjustment between the stowage position and the use position, in a linear displacement movement and a rotation movement in at least substantially one plane,
- the adjustment device for carrying out the linear displacement movement has at least a first linear guide and a second linear guide,
- the first linear guide being fixedly coupled in the receptacle of the console, and
- the adjustment device has a rotary joint which mounts the second linear guide so as to be rotatable to the console.

* * * * *